United States Patent
Arai et al.

(10) Patent No.: US 11,255,275 B2
(45) Date of Patent: Feb. 22, 2022

(54) INTAKE DEVICE

(71) Applicant: Hitachi Astemo, Ltd., Hitachinaka (JP)

(72) Inventors: Kazuki Arai, Utsunomiya (JP); Masao Yamazaki, Kuki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/255,694

(22) PCT Filed: Jun. 20, 2019

(86) PCT No.: PCT/JP2019/024417
§ 371 (c)(1),
(2) Date: Dec. 23, 2020

(87) PCT Pub. No.: WO2020/059227
PCT Pub. Date: Mar. 26, 2020

(65) Prior Publication Data
US 2021/0285387 A1    Sep. 16, 2021

(30) Foreign Application Priority Data
Sep. 18, 2018  (JP) .............................. JP2018-173575

(51) Int. Cl.
*F02D 9/10*      (2006.01)
*F02M 35/12*    (2006.01)

(52) U.S. Cl.
CPC ........... *F02D 9/1005* (2013.01); *F02D 9/104* (2013.01); *F02M 35/1211* (2013.01)

(58) Field of Classification Search
CPC .... F02D 9/1005; F02D 9/104; F02M 35/1211

USPC ........................................................ 123/434
See application file for complete search history.

(56) References Cited

U.S. PATENT DOCUMENTS

2013/0098326 A1    4/2013   Wakamatsu et al.
2019/0195144 A1*   6/2019   Burns ..................... F02D 9/101

FOREIGN PATENT DOCUMENTS

| JP | 2000-291452 | 10/2000 |
| JP | 2001-020814 | 1/2001 |
| JP | 3430840 | 7/2003 |
| JP | 2013-087730 | 5/2013 |

OTHER PUBLICATIONS

International Search Report dated Sep. 3, 2019, Application No. PCT/JP2019/022417, 4 pages.

* cited by examiner

*Primary Examiner* — Mahmoud Gimie
(74) *Attorney, Agent, or Firm* — Rankin, Hill & Clark LLP

(57) ABSTRACT

An intake device is provided with a throttle body having a valve that can rotate relative to a body, and an intake pipe provided downstream of the throttle body and connected to an internal combustion engine, an intake passage of the intake pipe being provided with a flow adjustment part that guides the air supplied from the throttle body in the direction in which the intake passage extends, and the flow adjustment part being provided to an upstream end that is on the throttle body-side in the intake passage and also being provided so as to connect to an inner peripheral surface of the intake passage at a position of non-contact when the valve is fully open.

6 Claims, 4 Drawing Sheets

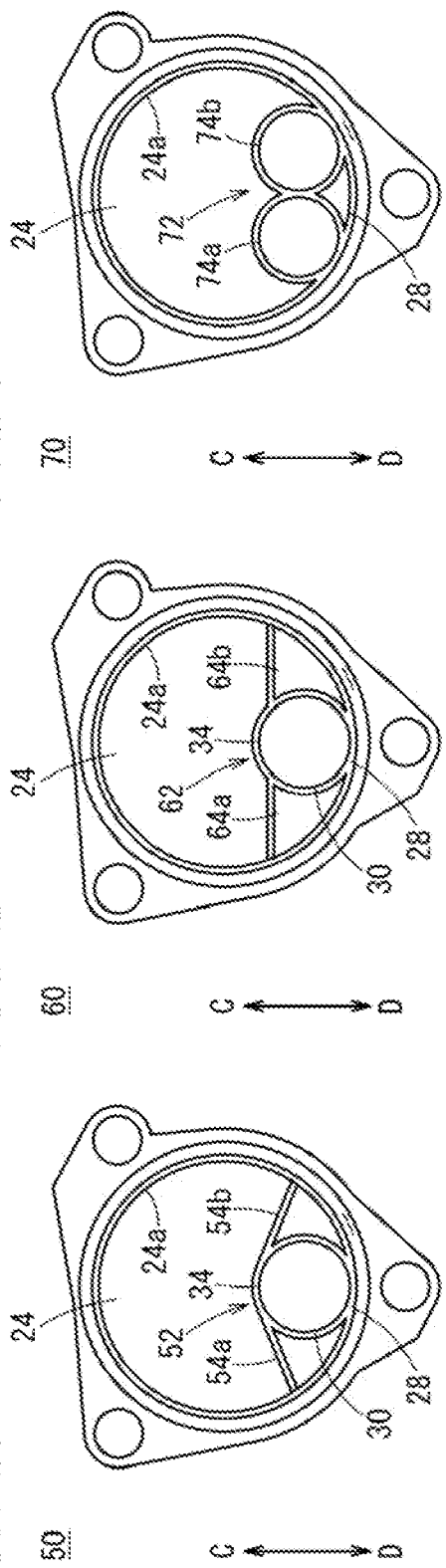

INTAKE DEVICE

TECHNICAL FIELD

The present invention relates to an intake device that can supply air into an internal combustion engine at a controlled flow rate.

BACKGROUND ART

Intake devices capable of controlling the amount of air into vehicles' internal combustion engines are conventionally known. Such an intake device includes a throttle valve device provided upstream so as to control the flow rate of air, and an intake pipe provided downstream of the throttle valve device so as to distribute the air into the cylinders of the internal combustion engine. The throttle valve device includes a butterfly valve provided in its fluid passage, which can be opened and closed through a shaft. Air taken in from outside is supplied into the internal combustion engine through the intake passage by opening the butterfly valve.

SUMMARY OF INVENTION

In such an intake device as described above, when the butterfly valve starts opening from its fully closed state, for example, the air that flows downstream on the side of one end of the butterfly valve that moves upstream may be raised upward on the downstream side of the butterfly valve, due to turbulence inside the intake passage. Then, a pressure fluctuation will occur and cause an intake noise.

In order to reduce such an intake noise, the intake device according to Japanese Patent No. 3430840 includes a throttle valve configured to open and close in the intake passage formed therein, and a round tube is provided downstream of the throttle valve in a central area on the axis line of the intake passage. This round tube extends along the axis line of the intake passage and splits up the airflow in the intake passage into a center area and peripheral area. The round tube has a cut formed in its upstream end that faces the throttle valve, so that the throttle valve does not come in contact with it when the throttle valve opens.

Then, when the throttle valve starts opening from its fully closed position where it blocks the intake passage, it allows air to flow downstream through the gaps formed between the upper and lower ends of the throttle valve and the intake passage. The airflows then pass on the outsides of the round tube, and thus split up and kept regulated without disturbance. This prevents pressure fluctuation from occurring and thus reduces intake noise due to the pressure fluctuation.

In the intake device of Japanese Patent No. 3430840, the round tube for reducing intake noise is located in a center area on the axis line of the intake passage. Accordingly, for example, when the throttle valve opens and moves upstream, the air flowing downstream through the gap between the intake passage and the upper end of the throttle valve may flow obliquely downward into the round tube. On the other hand, part of the air flowing through the gap between the lower end of the throttle valve and the intake passage may flow into the round tube. Then, the airflows will hit against each other to cause an intake noise.

A general object of the present invention is to provide an intake device capable of further reducing intake noise that would occur when the valve is opened from its fully closed state.

An aspect of the present invention is directed to an intake device including a valve rotatably provided through a shaft, for opening and closing an intake passage that air flows in, wherein the valve is arranged in a manner that, in a fully closed state thereof, the valve extends orthogonal to a direction that the intake passage extends in, and wherein the valve is rotated around the shaft from the fully closed state to open the intake passage in a manner that one end of the valve moves upstream and another end thereof moves downstream, to thereby control a flow rate of the air supplied into an internal combustion engine through the intake passage, the intake device including a flow regulating structure configured to guide, downstream, part of the air flowing in the intake passage, the flow regulating structure being disposed downstream of the valve and arranged to face the one end of the valve in the fully closed state, the flow regulating structure extending along the intake passage and being connected to an inner peripheral surface of the intake passage, the flow regulating structure including a round tube body having a cross section with a smaller diameter than the intake passage, the flow regulating structure being configured and arranged in a manner that, when the valve is fully open, the flow regulating structure resides in a position that is radially outside of, and out of contact with, the another end of the valve.

According to the invention, the intake device includes the valve that is rotatably supported through a shaft and that is opened from its fully closed state in such a manner that its one end moves upstream and the other end moves downstream. The intake passage containing the valve therein is provided with the flow regulating structure that is disposed downstream of the valve and faces the one end of the valve when the valve is fully closed. The flow regulating structure extending along the intake passage and connected to the inner peripheral surface of the intake passage, includes the round tube body having a cross section with a smaller diameter than the intake passage. The round tube body is configured and arranged such that, when the valve is fully open, the round tube body resides radially outside of, and out of contact with, the other end of the valve.

Thus, when the valve opens from its fully closed state, the valve rotates together with the shaft in such a manner that its one end moves upstream and the other end moves downstream, and then air flows from the upstream side to the downstream side through the spaces formed between the inner peripheral surface of the intake passage and the one and the other ends of the valve. At this time, on the downstream side of the valve, the air flowing in through the space between one end of the valve and the intake passage flows inside the round tube body, and is guided downstream in a preferable manner along the intake passage. Thus, this airflow is prevented from flowing toward, and mixing with, the airflow that has entered through the space between the other end of the valve and the intake passage.

As a result, unlike in the conventional intake device where the air from the upper end side of the throttle valve and the air from its lower end side may hit against each other in the round tube, the airflow from the one end side of the valve is guided downstream in a preferable manner by the flow regulating structure and is prevented from mixing with the airflow from the other end side of the valve. This prevents pressure fluctuation and further reduces intake noise that would otherwise be caused by the pressure fluctuation.

BRIEF DESCRIPTION OF DRAWINGS

FIGS. 4A, 4B, 4C, 4D, 4E, and 4F are cross sectional views respectively illustrating intake devices having flow regulating structures of first to sixth modifications.

DESCRIPTION OF EMBODIMENTS

Figure 1:
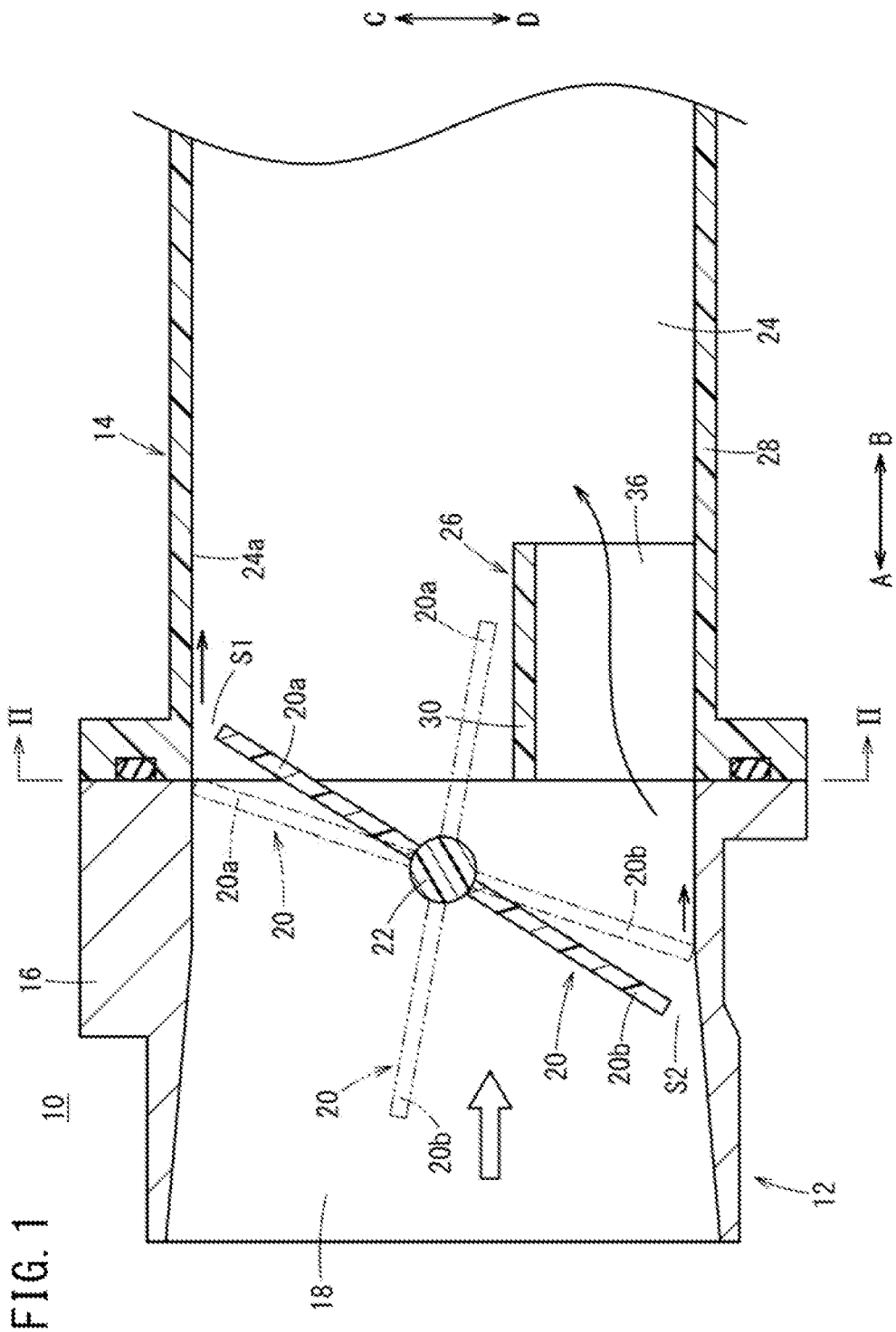
FIG. 1 is an overall cross section of an intake device according to an embodiment of the present invention.

As shown in FIG. 1, an intake device 10 includes a throttle body 12 for controlling the flow rate of air supplied into an internal combustion engine not shown, for example, and an intake pipe 14 connected downstream of the throttle body 12, for supplying the air into the internal combustion engine.

The throttle body 12 is connected downstream of an air duct (not shown) for taking in outside air, for example, and the throttle body 12 includes a body 16, and a disk-shaped valve 20 rotatably supported inside a passage (intake passage) 18 of the body 16. The body 16 is made of a metal material, for example, and includes the passage 18 passing therethrough in a straight line. This passage 18 has its one end connected to the air duct and its other end connected to the intake pipe 14.

The valve 20 is a butterfly valve that rotates through a shaft 22 that is connected to a central part thereof. The valve 20 is located in the body 16 in a position closer to the aforementioned other end (downstream side, the arrow B side) from the center of the axis direction of the body 16, and the valve 20 has a circular cross section that corresponds to the cross section of the passage 18 in the body 16. The shaft 22 is positioned orthogonal to the axial direction of the body 16 (the arrow A-B direction), and both ends of the shaft 22 are inserted in holes (not shown) that are opened into the passage 18 of the body 16, whereby the shaft 22 is rotatably supported together with the valve 20. A driving source not shown is connected to one end of the shaft 22, and the shaft 22 rotates by a driving force transmitted from the driving source.

The valve 20 is arranged such that, in the fully closed state where the valve 20 fully closes the passage 18 (shown by one-dot chain line in FIG. 1), it is inclined at a certain angle in such a manner that its upper end (the other end) 20a resides somewhat downstream (on the arrow B side) and its lower end (the one end) 20b resides somewhat upstream (on the arrow A side), with the upper end 20a and the lower end 20b being in contact with the inner peripheral surface of the passage 18.

When the valve 20 opens from this fully closed state, the shaft 22 rotates clockwise to cause the upper end 20a to move downstream (in the arrow B direction) around the shaft 22 and the lower end 20b to turn upstream (in the arrow A direction) around the shaft 22. When the valve 20 is fully open, the valve 20 lies horizontally along the axis line of the body 16, or the valve 20 overshoots to a position where the upper end 20a has further opened somewhat downward from the horizontal position past the axis line (shown by two-dot chain line in FIG. 1).

Figure 2:
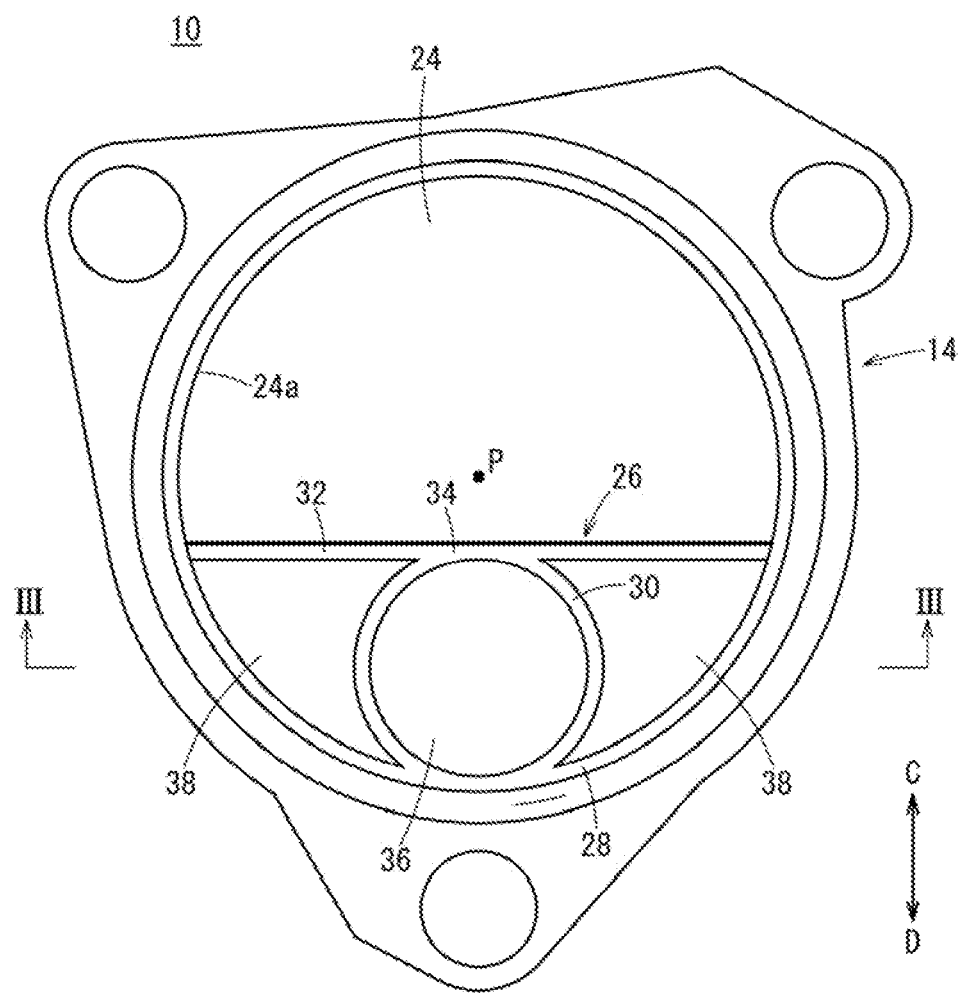
FIG. 2 is a cross section of an intake pipe taken along line II-II in FIG. 1.
Figure 3:
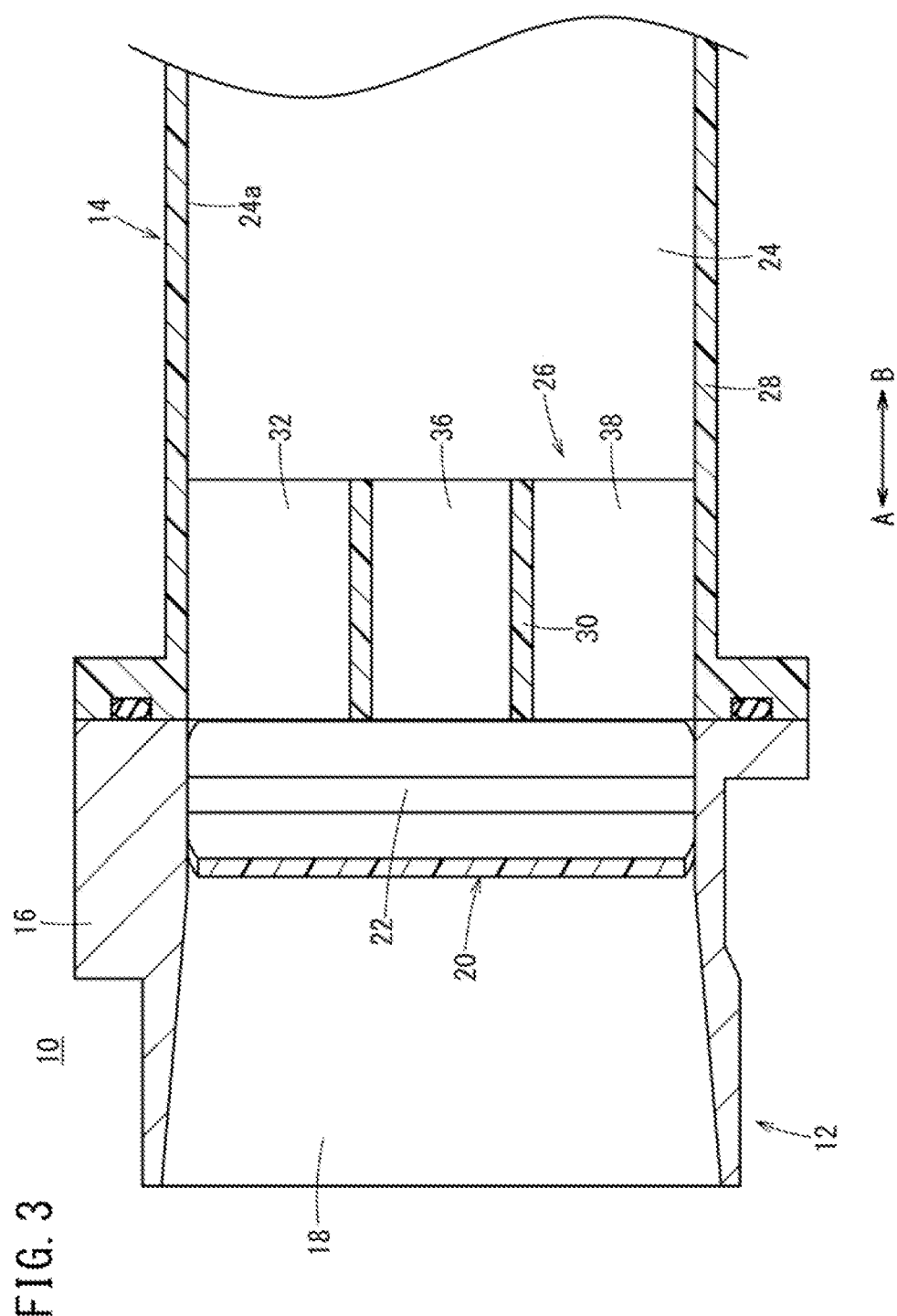
FIG. 3 is the cross section of the intake pipe taken along line III-III in FIG. 2.

As shown in FIGS. 1 to 3, the intake pipe 14 is made of a resin material and has a circular cross section, for example. The intake pipe 14 extends along the axial direction (the arrow A-B direction) and has an intake passage 24 formed therein. Then, one end of the intake pipe 14 on the upstream side is connected to the aforementioned other end of the throttle body 12 on the downstream side, and the other end of the intake pipe 14 constitutes an intake manifold (not shown) including branch pipes connected to the internal combustion engine not shown.

Further, a flow regulating structure 26 for regulating the airflow in the intake passage 24 is provided at the aforementioned one end of the intake passage 24 (intake pipe 14) that faces the throttle body 12.

For example, the flow regulating structure 26 is situated in a space near the bottom wall 28 of the intake passage 24 that lies radially outward, in such a manner that it faces the lower end 20b of the valve 20 when the valve 20 is fully closed. The flow regulating structure 26 extends in a certain length in the axial direction from one end of the intake pipe 14 toward the other end thereof (in the arrow B direction). The flow regulating structure 26 includes a cylinder-shaped guide tube (round tube body) 30 and a guide plate (supporting body) 32 supporting the guide tube 30. That is, the flow regulating structure 26 is situated in the most upstream position in the intake passage 24 (at the aforementioned one end, on the arrow A side) in such a manner that, as viewed in the axial direction of the intake pipe 14, the flow regulating structure 26 faces the lower end 20b when the valve 20 is fully closed (see FIG. 1).

The flow regulating structure 26 including the guide tube 30 and the guide plate 32 is formed simultaneously and integrally in the process of forming the intake pipe 14.

The guide tube 30 has a circular cross section having a diameter that is smaller than that of the intake passage 24, and extends along the axial direction (the arrow A-B direction) with its diameter unchanged. A part of the outer peripheral surface of the guide tube 30 facing the bottom wall 28 (the inner peripheral surface) of the intake passage 24, is connected to the bottom wall 28. That is, the guide tube 30 is formed in such a manner that the intake passage 24 and the guide tube 30 extend in substantially parallel to each other.

The guide tube 30, connected to the bottom wall 28 of the intake passage 24, has such a diameter that it does not contact the valve 20 when the valve 20 has overshot past its fully open position. In other words, the height of the guide tube 30 from the bottom wall 28 of the intake pipe 14 is set such that it does not overlap the path of rotation of the valve 20 and does not come in contact with it in the fully closed state and overshot state.

As shown in FIG. 2, the guide plate 32 is connected to a top 34 of the guide tube 30 that is closer to the axial center P of the intake passage 24 (on the arrow C side), and the guide plate 32 touches the outer peripheral surface of the guide tube 30. Further, the guide plate 32 extends to an inner peripheral surface 24a of the intake passage 24 substantially horizontally in a straight line, and both ends thereof are connected to the inner peripheral surface 24a. The length of the guide plate 32 along the axial direction (the arrow A-B direction) is formed to be substantially equal to the length of the guide tube 30 along the axial direction (the arrow A-B direction).

When viewed in the axial direction of the intake pipe 14 shown in FIG. 2, the flow regulating structure 26 forms a first flow regulating passage 36 in the interior of the guide tube 30, and second flow regulating passages 38 in the interiors surrounded by the guide plate 32, the guide tube 30, and the intake passage 24. In other words, the flow regulating structure 26 is formed in such a manner that it divides an area near the bottom wall 28 of the intake passage 24 on the upstream side of the intake passage 24.

The intake device 10 of the embodiment of the invention is constructed basically as described above. Next, its operations, functions and effects will be described. The description below assumes that the valve 20 is fully closed and the airflow from the throttle body 12 into the intake pipe 14 is off in the initial state.

First, in this initial state, the shaft 22 is rotated clockwise by being driven by a driving source not shown, causing the valve 20 to turn clockwise. Then, the upper end 20a of the valve 20 starts moving into the intake passage 24 (downstream, in the arrow B direction) along the inner peripheral surface of the passage 18, and the lower end 20b starts moving upstream (in the arrow A direction) along the inner peripheral surface of the passage 18. In other words, the lower end 20b of the valve 20 moves in the direction away from the intake pipe 14 (in the arrow A direction).

This allows the air taken in from the outside of the vehicle through the air duct to flow from the passage 18 of the throttle body 12 into the intake pipe 14 (in the arrow B direction) through spaces S1 and S2 that are formed respectively between the upper end 20a and the lower end 20b of the valve 20 and the inner peripheral surface of the passage 18.

At this time, most of the air that flows into the intake passage 24 through the space S2 on the lower side (the arrow D side) flows downstream through the first flow regulating passage 36 inside the guide tube 30 of the flow regulating structure 26, and the remaining part of the airflow, which is outside of the guide tube 30, flows downstream through the pair of second flow regulating passages 38 surrounded by the guide tube 30 and the guide plate 32.

As a result, the flow regulating structure 26 can certainly separate the airflow into the intake passage 24 through the space S2 (lower airflow) and the airflow into the intake passage 24 through the space S1 (upper airflow), thereby favorably preventing the upper airflow and the lower airflow from mixing together within the intake passage 24. This prevents pressure fluctuation due to the mixing and reduces intake noise that would otherwise be caused by the pressure fluctuation.

After that, the valve 20 is further turned clockwise by the driving action of the driving source not shown, and then the valve 20 is fully opened to allow the air supplied into the passage 18 of the throttle body 12 to flow through the intake passage 24 of the intake pipe 14 to be supplied into the internal combustion engine.

As has been described above, in the embodiment, the intake pipe 14 is connected to the downstream side of the throttle body 12 having the rotatable butterfly valve 20, and the flow regulating structure 26 is provided at the upstream end of the intake passage 24 of the intake pipe 14 that is located on the side of the throttle body 12. The flow regulating structure 26 is connected to the bottom wall 28 of the intake passage 24, and includes the guide tube 30 shaped like a cylinder and connected to the bottom wall 28, and the guide plate 32 connected to the outer peripheral surface of the guide tube 30 and extending substantially horizontally to be connected to the intake passage 24.

With this configuration, when the valve 20 provided in the throttle body 12 starts opening from its fully closed position, the airflow into the intake passage 24 through the space S2 between the lower end 20b of the valve 20 and the passage 18 can be guided by the flow regulating structure 26 to flow downstream (in the arrow 3 direction) along the intake passage 24. This prevents the airflow from being deflected upward by turbulence etc. in the intake passage 24.

As a result, when the valve 20 starts opening from the fully closed state and air flows from the throttle body 12 into the intake passage 24, the lower airflow entering from the lower end 20b side of the valve 20, and the upper airflow entering from the upper end 20a side of the valve 20, are prevented from mixing together in the upstream side of the intake passage 24, unlike in the conventional intake device where the airflow from the upper end side of the throttle valve and the airflow from the lower end side of the throttle valve may hit against each other within the round tube to cause an intake noise. This prevents pressure fluctuation due to the mixing of the upper and lower airflows, and thus reduces the intake noise due to the pressure fluctuation in a preferable manner.

Further, the flow regulating structure 26 includes the guide tube 30 that is connected to the inner peripheral surface 24a of the intake passage 24, so that the air flowing into the intake passage 24 from the lower end 20b side of the valve 20 can certainly be guided downstream through the guide tube 30, without being deflected upward. This reliably prevents the mixing with the airflow (upper airflow) entering from the upper end 20a side of the valve 20.

Moreover, the flow regulating structure 26 includes not only the cylindrical guide tube 30 but also the guide plate 32 connecting the guide tube 30 and the inner peripheral surface 24a of the intake pipe 14, so that the guide plate 32 enhances the rigidity of the flow regulating structure 26, compared to a configuration where only the guide tube 30 is connected to the intake pipe 14. As a result, when vibration from the vehicle is applied to the intake device 10, for example, the flow regulating structure 26 having enhanced rigidity can certainly be maintained in position.

Furthermore, this guide plate 32 forms the second flow regulating passages 38 between the guide tube 30 and the intake passage 24, as well as enhancing the rigidity of the flow regulating structure 26, so that the air that passes not through the guide tube 30 but on the sides thereof can be guided downstream in a preferable manner through the second flow regulating passages 38. Accordingly, as compared to a configuration having the guide tube 30 only, the flow regulating effect by the flow regulating structure 26 is further improved to contribute to reducing the intake noise.

Moreover, the diameter of the guide tube 30 is set to a maximum length that does not allow the upper end 20a of the valve 20 to come in contact with it when the valve 20 is fully open or when the valve 20 overshoots somewhat past the fully open position. Accordingly, the air flowing in from the throttle body 12 can be efficiently taken into the first flow regulating passage 36 of the guide tube 30 and guided downstream.

That is, if the diameter of the guide tube 30 is small, the airflow entering from the throttle body 12 and deflecting upward (lower airflow) cannot foe guided into the guide tube 30 efficiently, and the lower airflow will mix with the upper airflow. Therefore, it is preferable to set the height of the guide tube 30 to a maximum height (maximum diameter) that does not allow the valve 20 to hit on it even when the valve 20 overshoots.

The amount of this overshoot of the valve 20 differs among throttle bodies 12, and so it is preferable to set the diameter of the guide tube 30 suitably according to the amount of overshoot.

The flow regulating structure 26 provided in the intake passage 24 is not limited to the above-described configuration that includes the single guide tube 30 and the guide plate 32 connected to the top 34 of the guide tube 30 substantially horizontally. For example, as shown in FIGS. 4A to 4F, intake devices 50, 60, 70, 80, 90, 100 having flow regulating structures 52, 62, 72, 82, 92, 102 may be adopted.

First, in the intake device 50 of a first modification shown in FIG. 4A, a pair of guide plates 54a, 54b are connected in a vicinity of the top 34 of the guide tube 30 of the flow regulating structure 52, and the guide plates 54a, 54b extend obliquely downward away from the guide tube 30 to be connected to the inner peripheral surface 24a of the intake passage 24.

In the intake device 60 of a second modification shown in FIG. 4B, a pair of guide plates 64a, 64b are connected to the outer peripheral surface of the guide tube 30 of the flow regulating structure 62 at positions that are somewhat shifted from the top 34 toward the bottom wall 28 of the intake passage 24 (in the arrow D direction), and the guide plates 64a, 64b extend substantially horizontally.

The guide plates 54a, 54b, 64a, 64b above are provided to connect the guide tube 30 and the inner peripheral surface 24a of the intake passage 24.

In this way, the guide plates 54a, 54b, 64a, 64b connected to the guide tube 30 are formed to connect a part near the top 34 of the guide tube 30 and the inner peripheral surface 24a of the intake passage 24. Connecting the guide tube 30 to the inner peripheral surface 24a of the intake passage 24 through the guide plates 54a, 54b, 64a, 64b can enhance the rigidity of the flow regulating structure 26 and the intake pipe 14 favorably and can increase the strength.

Further, in the intake device 70 of a third modification shown in FIG. 4C, a pair of guide tubes 74a, 74b are arranged side by side, facing the bottom wall 28 of the intake passage 24. The outer periphery of one guide tube 74a and the outer periphery of the other guide tube 74b are connected to each other, and the pair of guide tubes 74a, 74b are connected to the bottom wall 28.

With this configuration, connecting the guide tubes 74a, 74b together further enhances the rigidity of the flow regulating structure 72, which eliminates the need for a guide plate for connecting the guide tubes 74a, 74b and the intake passage 24. Further, since the guide tubes 74a, 74b formed as round tube bodies provide higher rigidity than a plate shape guide plate, the pair of guide tubes 74a, 74b can further enhance the rigidity compared to a configuration having such a plate shape guide plate, increasing the strength of the flow regulating structure 72.

Furthermore, in the intake device 80 of a fourth modification shown in FIG. 4D, three guide tubes 84a, 84b, 84c, constituting a flow regulating structure 82, are arranged side by side along the bottom wall 28 of the intake passage 24. The guide tubes 84a, 84b, 84c are connected to each other and also to the bottom wall 28.

Further, in the intake device 90 of a fifth modification shown in FIG. 4E, the three guide tubes 84a, 84b, 84c constitute a flow regulating structure 92, and the top portions of two of the three guide tubes 84a, 84b, 84c are connected to each other by a guide plate (second supporting body) 94. In the intake device 100 of a sixth modification shown in FIG. 4F, a guide plate 104 connected to the three guide tubes 84a, 84b, 84c constituting a flow regulating structure 102 has both ends thereof extending and connected to the inner peripheral surface 24a of the intake passage 24.

In this way, the rigidity of the flow regulating structures 82, 92, 102 can foe further enhanced by adopting the configurations where the three guide tubes 84a, 84b, 84c arranged side by side along the bottom wall 28 of the intake passage 24 are connected to each other and also to the bottom wall 28. Further, the flow regulating structures 92, 102 further having the guide plate 94, 104 enhances the rigidity still further to increase the strength.

The intake device according to the present invention is not limited to the embodiments described above, but can of course adopt various configurations without departing from the essence and gist of the invention.

The invention claimed is:

1. An intake device including a valve rotatably provided through a shaft, for opening and closing an intake passage that air flows in, wherein the valve is arranged in a manner that, in a fully closed state thereof, the valve extends orthogonal to a direction that the intake passage extends in, and wherein the valve is rotated around the shaft from the fully closed state to open the intake passage in a manner that one end of the valve moves upstream and another end thereof moves downstream, to thereby control a flow rate of the air supplied into an internal combustion engine through the intake passage, the intake device comprising a flow regulating structure configured to guide, downstream, part of the air flowing in the intake passage, the flow regulating structure being disposed downstream of the valve and arranged to face the one end of the valve in the fully closed state, the flow regulating structure extending along the intake passage and being connected to an inner peripheral surface of the intake passage, the flow regulating structure including: a round tube body having a circular cross section with a smaller diameter than the intake passage, the round tube body extending along the intake passage with the diameter thereof unchanged and having an outer peripheral surface connected to the inner peripheral surface of the intake passage; and a supporting body that connects the inner peripheral surface of the intake passage and the outer peripheral surface of the round tube body, the flow regulating structure being configured and arranged in a manner that, when the valve is fully open, the flow regulating structure resides in a position that is radially outside of, and out of contact with, the another end of the valve, the intake device further comprising a throttle body including the valve, and an intake pipe disposed downstream of the throttle body and connected to the internal combustion engine, wherein the intake passage is formed to pass through from the throttle body into the intake pipe, and the flow regulating structure is disposed at an upstream end of the intake passage in the intake pipe, the round tube body including: a first semicircular arc separated from the inner peripheral surface of the intake passage; and a second semicircular arc connected to the inner peripheral surface of the intake passage, wherein the first semicircular arc is entirely separated from the inner peripheral surface of the intake passage, and the second semicircular arc includes a connected portion connected to the inner peripheral surface of the intake passage and unconnected portions not connected to the inner peripheral surface of the intake passage, the unconnected portions being positioned on both sides of the connected portion in a circumferential direction of the round tube body.

2. The intake device according to claim 1, wherein the supporting body is shaped like a plate and formed to extend in a radial direction of the intake passage from an outer peripheral surface of the first semicircular arc of the round tube body.

3. The intake device according to claim 1, wherein the supporting body includes another round tube body that is different from the round tube body.

4. The intake device according to claim 3, wherein the another round tube body comprises at least two other round tube bodies and the flow regulating structure includes a second supporting body that connects the other round tube bodies to each other.

5. The intake device according to claim 1, wherein the diameter of the round tube body is set to a maximum length that does not allow the valve to come in contact with the round tube body in a range that the valve rotates in.

6. The intake device according to claim 1, wherein the supporting body connects to the first semicircular arc of the round tube body at a position diametrically opposed to the connected portion of the semicircular arc of the round tube body.

\* \* \* \* \*